July 24, 1962 J. M. WOLFSKILL ET AL 3,046,423

HIGH SHOCK AND VIBRATION RESISTANT PIEZOELECTRIC CRYSTAL UNITS

Filed Oct. 9, 1958

2 Sheets-Sheet 1

INVENTORS
JOHN M. WOLFSKILL
RICHARD H. TUZNIK
BY
Allen and Chromy
ATTORNEYS

HIGH SHOCK AND VIBRATION RESISTANT PIEZOELECTRIC CRYSTAL UNITS

Filed Oct. 9, 1958

2 Sheets-Sheet 2

INVENTORS
JOHN M. WOLFSKILL
RICHARD H. TUZNIK
BY
Allen and Chromy
ATTORNEYS 3,046,423
HIGH SHOCK AND VIBRATION RESISTANT PIEZOELECTRIC CRYSTAL UNITS John M. Wolfskill and Richard H. Tuznik, Erie, Pa., assignors to Bliley Electric Company, Erie, Pa., a corporation of Pennsylvania Filed Oct. 9, 1958, Ser. No. 766,259
7 Claims. (Cl. 310—9.1)

This invention relates to piezoelectric crystal apparatus in general. More particularly this invention relates to piezoelectric crystal units provided with crystal supports such that high shock and vibration have substantially no effect on the performance characteristics of the crystal.

In the mechanical mounting of vibrated piezoelectric crystals it is necessary to mount and support them in such a manner that the vibration characteristics of the crystals are affected a minimum amount by the support structure. This may be done by fastening the supports at nodal points of the quartz crystal or at points in which the vibratory motion is at a minimum and will, therefore, have the least damping effect on the crystal's oscillation characteristics. With high frequency crystals the support mechanism can usually be isolated from the active area of the crystal and, therefore, rather rigid mountings can be made without this problem.

On low frequency quartz crystal units this is not the case, and while nodal points can be selected for fastening the supports, some damping action usually takes place. The method heretofore used consisted of firing a silver spot to the quartz blank at the nodal point or points and then soldering a wire to the silver spot or spots. The length of the wire between the crystal support and the mounting therefor was usually mechanically resonant as a cantilever to the crystal's natural frequency and such a structure is described in Patent No. 2,240,453.

The problem that arises in aircraft and missile applications of low frequency quartz crystals is that of preventing the basic support structure of the crystal blank from transmitting energy along the support wires into the crystal, and affecting its frequency or activity. It is easily seen that if a crystal is semi-rigidly supported as in conventional holders and the crystal were vibrated or shocked so as to cause the support structure to vibrate at a natural resonance frequency thereof, the crystal performance could be seriously affected and if the vibration is strong enough it may actually destroy or loosen the solder joint between the crystal and its supports.

It is therefore an object of this invention to provide an improved low frequency crystal support structure in which the effects of extraneous influences such as high shock or vibration on the crystal blank proper are substantially eliminated and they therefore do not affect its performance characteristics under environmental conditions.

It is a further object of this invention to provide an improved supporting structure for piezoelectric crystals, said supporting structure being designed for any given frequency crystal and for any environmental condition of variable interfering frequency, such that any natural resonance frequencies in the supporting structure are outside of the range of the environmental condition frequencies, whether these be continuous and sinusoidal or induced as a result of shock.

It is a further object of this invention to provide a simple symmetrical supporting structure for piezoelectric crystals such that CT or DT face shear mode crystals, in which the nodal point is usually in the center of the blank, or the X cut or 5° X cut or flexure types, in which there is more than one nodal point, can be mounted thereby.

Another object of this invention is to provide a supporting structure for piezoelectric crystals in which the effects of expansion and contraction of the support structure is not transmitted to the crystal blank and thereby does not affect its performance over wide temperature ranges.

It is a further object of this invention to provide a mounting structure for piezoelectric crystals such that a shock mounting of the crystal blank can be effected thereby and in which any natural resonance frequencies of the supporting elements are outside the range of desired frequencies of vibration of the crystal blank.

Still another object of this invention is to provide a mounting structure for piezoelectric crystals, said mounting being as compliant as possible, consistent with the requirement that it be stiff enough to avoid damaging vibrational frequencies.

A further object of this invention is to provide a mounting structure for piezoelectric crystals, said mounting structure being as symmetrical as possible around the center of gravity of the crystal blank so that complex motions of vibration resulting from random excitation are minimized.

Other and further objects of this invention will be apparent to those skilled in the art to which it relates from the following specification, claims and drawing.

In accordance with this invention the piezoelectric crystal is mounted in the main support or frame by suitable wire members so as to produce a unit having a certain symmetry. The main support or frame is of ceramic although it could also be made out of metal if glass beads or other insulated terminals were used to insulate the wire members from the metal frame. The wire members are used on each side of the ceramic or metal frame and in case the ceramic frame is used they can be fastened thereto by placing fired silver on the ceramic and then soldering the wire members to the fired silver. The wire members that are fastened to the crystal faces are preferably resonant to the frequency of the crystal or some multiple or sub-multiple thereof and the outer ends of these wire members are then soldered to wire members extending across the frame. The soldering at this point is usually of sufficient weight to provide termination to the resonant wire. The length and diameter of the wire members extending across the frame can be determined for a given mass of crystal such that the mechanical resonant frequencies of these supporting wire members are outside of the range of mechanical vibration rates of frequencies to be encountered in service. As an example, present missile requirements are that a crystal unit of say, 300 kc. perform without deleterious effects and without failure when subjected to mechanical vibration in the range of 10 to 1000 cycles with acceleration of 10 to 20 gravity units.

Further details of this invention are set forth in the following specification, claims and drawing in which briefly:

Figures 1, 2, 3, 4:
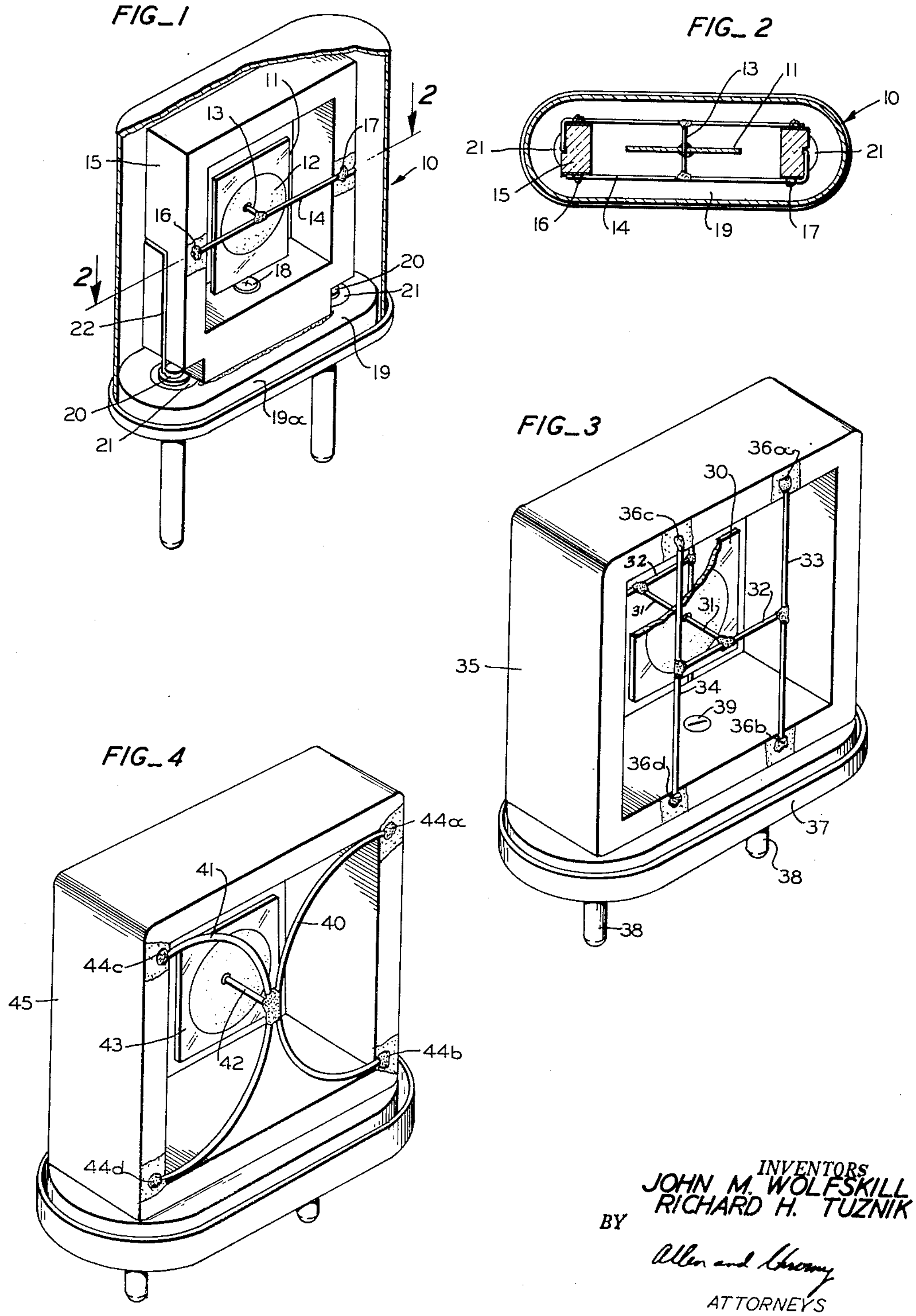
FIGURE 1 illustrates an embodiment of this piezoelectric crystal mounting structure.
FIGURE 2 is a sectional view taken along the line 2—2 of FIGURE 1.
FIGURE 3 illustrates a modified form of piezoelectric crystal mounting structure employing H-shaped wire members on each side of the main frame.
FIGURE 4 is a view of a further modification of this invention employing two arcuate wire members on each side of the main frame.

Referring to FIGURES 1 and 2 of the drawing in detail there is shown a piezoelectric crystal unit 10 made in accordance with this invention and in this unit the crystal blank 11 is provided with contiguous electrodes, such as the electrodes 12 to each of its major faces which electrodes are applied in accordance with processes known in the art. This crystal blank is supported by means of wire members 13 that are soldered substantially to the centers of these electrodes, and the lengths of these wires may be determined from the data disclosed in U.S. Patent No. 2,240,453. These wire members 13 should be positioned as close to the center of the crystal blank as possible so that there will be substantially no moment of force around the axis of these wire members as will be discussed hereinafter. The outer ends of the wire members 13 are attached to cross members 14 which in the case of the form of this invention shown in FIGURES 1 and 2, are parallel to each other and the ends of these horizontal wire supports or members 14 are attached by solder to the sides of the frame 15 which may be made of suitable metal or ceramic material.

The horizontal wire supports 14 and the wire members 13 function to connect the electrodes of the crystal blank 11 to a suitable electrical circuit and for this purpose connections are made to these horizontal wire members as will be described hereinafter. Consequently, if the frame member 15 is made of metallic material or electrically conductive material suitable insulation which may be in the form of glass beads or resins such as epoxy resin must be provided in holes or notches formed in the frame member at the locations where the horizontal wire members are supported by the frame member so that these wire members are suitably insulated from the frame. Such insulation may be positioned in suitable holes formed in the frame member and fused or cemented thereto so that they are firmly held on the frame. The outer ends of these glass beads spaced from the metallic frame member may be coated with a metallic coating of silver or similar material to which the wire members 14 are attached by solder.

In cases where the frame member 15 is made of ceramic materials suitable notches are cut into the sides of this frame and these are provided with a fired silver coating so that the ends of the wire supports 14 may be attached thereto by solder. One of these silvered areas on each side of the frame 15 is connected to the terminals of the piezoelectric crystal unit.

The frame 15 is provided with a screw receiving hole in the bottom portion thereof and the screw 18 is lodged therein for the purpose of fixedly attaching this frame to the base 19 of the unit. Instead of this screw fastener or in addition thereto suitable adhesive or cement of epoxy resin, for example, may be used to fasten the frame 15 to the base 19.

The base 19 is provided with a pair of glass beads 21 that are lodged in suitable holes formed therein and fused thereto. These glass beads are provided with terminals 20 fused therein so that these terminals are insulated from the base 19. Suitable connecting wires 22 are soldered to the terminals 20 and these connecting wires extend up along the sides of the frame 15 to the respective horizontal supporting wires 14 to which they are connected, so that one of the electrodes 12 is connected to one of the terminals 20 and the other electrode 12 is connected to the other terminal 20. In cases where the frame 15 is of ceramic material the connecting wires 22 may be in the form of narrow silvered areas attached to the opposite sides of the frame and these extend up to the horizontal opposite wire members 14 to provide the desired connections to the electrodes 12. However, where the frame 15 is of metallic material these connecting wires or members 22 must be insulated from the frame member. After the unit is assembled on the base 19 a suitable can-shaped cover is placed thereover and the edge of this cover is lodged in the groove 19*a* of the base and soldered therein.

In FIGURE 3 there is shown a variation of the basic structure illustrated in FIGURES 1 and 2 and this variation provides a unit with more isolation and improved shock absorbing characteristics. The piezoelectric crystal blank 30 is provided with a pair of wires 31 that are attached substantially to the centers of the respective electrodes by solder and the outer ends of these wires 31 are attached to horizontal members 32 on opposite sides of the unit. These horizontal wire members 32 form the central members of H-shaped support that include the vertical side members 33 and 34. Thus the members 32 on each side of the unit have the ends thereof attached substantially to the centers of the vertical members 33 and 34 as illustrated in FIGURE 3 which shows one of the H-shaped supports. These H-shaped supports and the crystal blank 30 are symmetrical around the axis of the wire supports 31.

The ends of the vertical wire member 33 are attached to silvered areas 36*a*, 36*b* and the ends of the wire member 34 are attached to the areas 36*c*, 36*d*. Where the frame 35 is of metallic material, suitable insulating supports made of material such as glass beads, epoxy resin and the like must in this case be provided to the frame for receiving the ends of the wire members 33 and 34 as described in connection with support members 14 shown in FIGURES 1 and 2.

The frame 35 is positioned on the base 37 and may be attached thereto by a suitable screw 39 or by means of a suitable cement made of the epoxy resins which cement may be used in addition to or in place of said screw if desired.

The modification of this invention shown in FIGURE 4 employs a pair of arcuate members 40 and 41, which are substantially semi-circular in shape, for supporting the crystal blank 43. In this case the wire members 42, one of which is attached substantially to the center of each of the electrodes of the major face of the crystal blank, are provided for supporting the crystal blank on the arcuate members 40 and 41 which are provided on each side of the frame 45. Thus an arrangement including the arcuate wires 40 and 41 and the horizontal wire member 42 such as illustrated is provided on the opposite sides of the crystal blank 43 so that similar structures are employed for supporting the crystal from each side. The ends of the arcuate wire members 40 and 41 are attached to the sides of the frame 45, surfaces of which have been coated with fired silver so that the wire members may be soldered thereto. In this case the frame 45 may also be made of metal and suitable glass beads or other insulating material may be provided thereto for the purpose of receiving the ends of the arcuate members as previously described in connection with FIGURES 1, 2 and 3.

Figures 5, 6, 7:
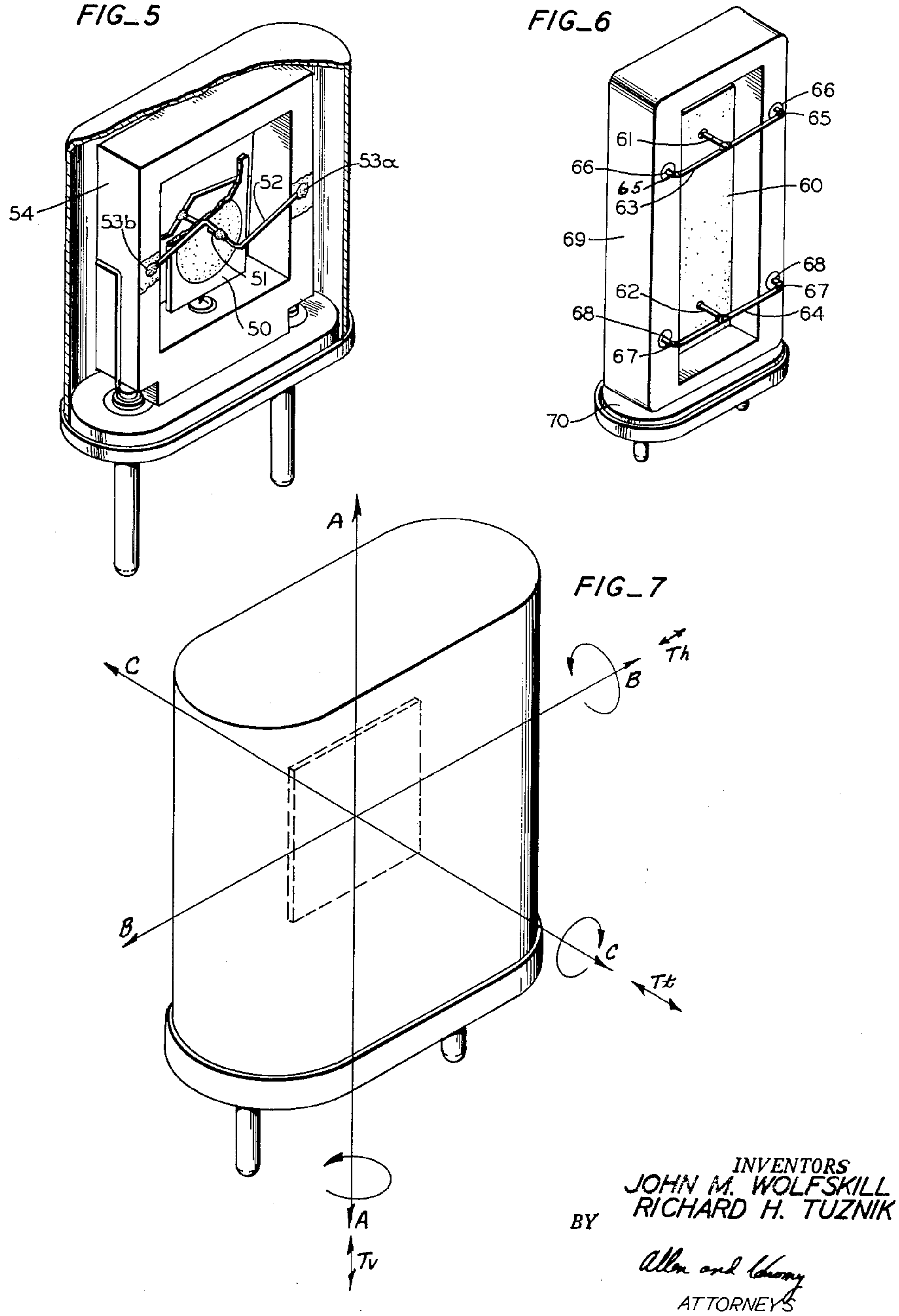
FIGURE 5 is a view of still another modification of this invention in which wire members of bent configuration are employed on each side of the main frame.
FIGURE 6 is a view of an application of this invention for the mounting of longitudinal flexure mode oscillation crystal units.
FIGURE 7 is a view employed to facilitate an explanation of the construction and principle of operation of this invention.

FIGURE 5 illustrates still another form of wire support that may be employed in accordance with this invention and in this case the crystal blank 50 is provided with wire members 51 attached substantially to the center of the electrode on each of the major faces and extending therefrom so that the outer ends of said members 51 may be attached substantially to the centers of the bent wire members 52 which are provided on each side of the crystal blank. The ends of each of the wire members 52 are attached to the frame member 54 on silvered areas such as the areas 53*a* and 53*b* shown on one side of the frame. In this modification the wires 52 positioned on each side of the crystal are provided with small bends so that if the lengths of these wires vary as a result of temperature variation, no strain is placed on the joints at the areas 53*a* and 53*b*.

In FIGURE 6 there is shown another modification of this invention in which a longitudinal flexure mode oscillation crystal blank 60 is supported in the frame 69 that is attached by means of suitable screws or cement or both to the base 70 of the unit. Each side of the crystal blank 60 is provided with a pair of supporting pin or wire members 61 and 62 which are attached to the contiguous electrode or electrodes of the crystal blank by means of solder or the like and which are positioned at a pair of spaced nodal points of the crystal blank. These wire supports are dimensioned to be proportional to the resonant frequency of the crystal blank or to some multiple or sub multiple of this frequency as previously described and the outer ends of these wires are attached by means of solder joints substantially to the centers of the cross wire members 63 and 64 respectively which solder joints also function to terminate these wires. Suitable metal pins 65 and 67 are supported on the frame 69 in insulation mounts 66 and 68 respectively, which insulation mounts may be made out of glass beads or suitable resins such as epoxy resins and these insulation mounts are positioned in holes formed in the frame 69 to which they adhere so that the pins 65 and 67 are held fixedly and rigidly in place on the frame. The ends of the cross wire 63 are attached to the outer ends of the supporting pins 65 by solder or the like and the ends of the cross wire 64 are attached to the outer ends of the pins 67, also by solder and the like. A similar mounting structure is provided for supporting the crystal blank 60 on the other side of the frame 69.

FIGURE 7 is a view showing the different axes along which translational vibrations may be encountered. The unit shown in this figure may be subjected to three pure translational modes of vibration; namely, the vertical, horizontal and thickness modes designated as $T_v$, $T_h$ and $T_t$ arrows which are aligned with the three axes A, B and C respectively and these may be designated as the axes of symmetry of the unit. This view taken with the views showing the different embodiments of this invention illustrates the symmetry in the supporting structure of the crystal blank whereby a symmetrical structure is obtained with reference to the several axes of a crystal unit designed to oscillate in the frequency range of fifty kilocycles to 600 kilocycles. The unit may be subjected to extraneous vibrations in the 20 to 2,000 cycle range, as well as acceleration or deceleration shock of from 10 to 20 gravity units, and the criteria set up as basic requirements are (1) there must be as much isolation of the crystal blank proper from the holder support thereof, consistent with the required strength, to withstand the high vibrational forces; (2) the mounting must be kept as compliant as possible consistent with the requirement that it be stiff enough to avoid damaging vibrational resonances which, if they occur, must be outside the frequency range of interest; (3) the mounting must have some leeway to take care of stresses that develop due to thermal expansion; (4) the mounting and crystal blank structure must be as symmetrical as possible around the center of gravity of the crystal blank so that complex motions resulting from random excitation are minimized; (5) the crystal blank support structure itself must not affect the dynamic impedance of the crystal. The mountings illustrated herein were all constructed with these basic requirements in view so that the vibrations in the translational modes $T_v$, $T_t$ and $T_h$ illustrated in FIGURE 7, as well as rotational responses around the vertical, horizontal and thickness axes designated by the circular arrows A, B and C is reduced to a minimum for the particular band of extraneous vibration frequencies set forth above.

While we have shown a preferred embodiment of the invention it will be understood that the invention is capable of variation and modification from the form shown so that its scope should be limited only by the scope of the claims appended hereto.

We claim:

1. A piezoelectric crystal support for supporting the piezoelectric crystal so that the transmission of high shock and undesired vibrations to the crystal through the support thereof is reduced to the point where such vibrations have substantially no effect on the performance characteristics of the crystal, comprising the combination of a piezoelectric crystal having a pair of major faces, electrodes for said major faces, a frame of rigid material having an opening, means for supporting said crystal in said frame opening so that said frame surrounds said crystal and both of the major faces of said crystal are substantially centered in said opening, said supporting means comprising supporting members engaging said major faces at nodal points thereof and extending away from said crystal substantially at right angles thereto, said supporting members each having a length that is proportional to the frequency of vibration of said crystal, and additional supporting members extending across said frame, said additional supporting members having their ends attached to said frame, and means for attaching the outer ends of said first mentioned supporting members to said additional supporting members, the length and diameter of said additional supporting members being such that the mechanical resonant frequencies of these additional supporting members are outside of the range of mechanical vibration rates of the undesired extraneous vibrations which it is desired to isolate from the crystal, said additional supporting members being arranged so that said supporting means and said crystal form a symmetrical structure around the axis defined by said first mentioned supporting members the frequency of vibration of said supporting means as a whole including said crystal being substantially different from the desired frequency of vibration of said crystal and also from the frequencies of the undesired extraneous vibrations.

2. A piezoelectric crystal support for supporting the piezoelectric crystal so that the transmission of high shock and undesired vibrations to the crystal through the support thereof is reduced to the point where such vibrations have substantially no effect on the performance characteristics of the crystal, comprising the combination of a piezoelectric crystal having a pair of major faces, electrodes for said major faces, a frame of rigid material having an opening, means for supporting said crystal in said frame opening so that said frame surrounds said crystal and said major faces extend across said opening, said supporting means comprising supporting members engaging said major faces at nodal points thereof and extending away from said crystal substantially at right angles thereto and terminating substantially in planes that are coplanar with the sides of said frame, said supporting members each having a length that is proportional to the frequency of vibration of said crystal, additional supporting members each having the ends thereof attached to one of the aforesaid sides of said frame, and means for attaching the outer ends of said first mentioned supporting members to said additional supporting members so that said supporting means and said crystal form a symmetrical structure around the axis defined by said first mentioned supporting members, the frequency of vibration of said supporting means as a whole including said crystal being substantially different from the desired frequency of vibration of said crystal and also from the frequencies of the undesired extraneous vibration.

3. A piezoelectric crystal support for supporting the piezoelectric crystal so that the transmission of high shock and vibrations to the crystal through the support thereof is reduced to the point where such vibrations have substantially no effect on the performance characteristics of the crystal, comprising the combination of a piezoelectric crystal having a pair of major faces, electrodes for said major faces, a frame of rigid material having an opening, means for supporting said crystal in said frame opening so that said frame surrounds said crystal so that said crystal is substantially parallel to said frame, said supporting means comprising supporting members engaging said major faces at nodal points thereof and extending away from said crystal substantially at right angles thereto, said supporting members each having a length that is proportional to the frequency of vibration of said crystal, additional supporting members each having the ends thereof attached to said frame, one of said additional members being attached to one side of said frame and another of said additional members being attached to the other side of said frame, and means for attaching the outer ends of each of said first mentioned supporting members substantially to the center of different ones of said additional supporting members, the frequency of vibration of said supporting means as a whole including said crystal being substantially different from the desired frequency of vibration of said crystal and also from the frequencies of the undesired extraneous mechanical vibrations.

4. A piezoelectric crystal support for supporting the piezoelectric crystal so that the transmission of high shock and extraneous vibrations to the crystal through the support thereof is reduced to the point where such vibrations have substantially no effect on the performance characteristics of the crystal, comprising the combination as set forth in claim 3, further characterized in that said additional supporting members comprise a pair of arcuate members positioned on each side of said crystal, each of said pair of arcuate members having the centers thereof attached to each other and to the outer end of the supporting member positioned on the corresponding side of said crystal.

5. A piezoelectric crystal support for supporting the piezoelectric crystal so that the transmission of high shock and extraneous vibrations to the crystal through the support thereof is reduced to the point where such vibrations have substantially no effect on the performance characteristics of the crystal, comprising the combination as set forth in claim 3, further characterized in that said additional supporting members are provided with slight bends therein to take up variations in the lengths thereof caused by temperature variations.

6. A piezoelectric crystal support for supporting the piezoelectric crystal so that the transmission of high shock and extraneous vibrations to the crystal through the support thereof is reduced to the point where such vibrations have substantially no effect on the performance characteristics of the crystal, comprising the combination of a piezoelectric crystal having a pair of major faces, electrodes for said major faces, a substantially rigid frame having an opening, means for supporting said crystal in said frame opening so that said frame surrounds said crystal, said supporting means comprising supporting members engaging said major faces and extending away from said crystal substantially at right angles thereto, said supporting members each having a length that is proportional to the frequency of vibration of said crystal, said means including additional supporting members on each side of said crystal, said additional supporting members, each comprising a cross member that is positioned parallel to said frame and to a major face of said crystal, means for attaching the outer end of the said supporting member on each side of said crystal substantially to the center of said cross member on the corresponding side of said crystal and means in said supporting means for supporting said cross member on each side of said crystal on the corresponding side of said frame in a plane that is substantially coplanar with said corresponding side, the lengths and diameters of said additional supporting members being such that the mechanical resonant frequencies thereof are outside of the range of mechanical vibration frequencies of the undesired extraneous vibrations and the frequency of vibration of said supporting means as a whole including said crystal being susbtantially different from the desired frequency of vibration of the crystal.

7. A piezoelectric crystal device that is adapted to perform without deleterious effects and without failure when subjected to mechanical vibration in the range of 10 to 2000 cycles with acceleration of 10 to 20 gravity units comprising the combination of a piezoelectric crystal having a pair of major faces, a substantially rigid open frame comprising a plurality of integral side members for framing the crystal therebetween, means for mounting said crystal in said open frame with the major faces of said crystal facing outwardly from said frame through the open sides thereof, said mounting means comprising wire members attached to said major faces and a pair of cross members, means for attaching the opposite ends of each of said cross members to opposite sides of said rigid frame member and means for attaching said wire members to mid portions of said cross members whereby said crystal is mounted in said frame substantially symmetrically around the center of gravity of the crystal.

References Cited in the file of this patent

UNITED STATES PATENTS

| | | |
|---|---|---|
| 2,194,676 | Schneider | Mar. 26, 1940 |
| 2,240,453 | Wolfskill | Apr. 29, 1941 |
| 2,301,269 | Gerber | Nov. 10, 1942 |
| 2,312,746 | Bokovay et al. | Mar. 2, 1943 |
| 2,371,613 | Fair | Mar. 20, 1945 |
| 2,474,241 | Garrison | June 28, 1949 |
| 2,559,494 | Brown | July 3, 1951 |
| 2,660,680 | Koerner | Nov. 24, 1953 |

FOREIGN PATENTS

| | | |
|---|---|---|
| 683,249 | Great Britain | Nov. 26, 1952 |